3,023,228
PRODUCTION OF URETHANE POLYISOCYANATE-UREA DIISOCYANATE MIXTURES

Kuno Wagner and Otto Bayer, Leverkusen, Germany, assignors, by direct and mesne assignments, of one-half to Farbenfabriken Bayer Aktiengesellschaft, Leverkusen, Germany, a corporation of Germany, and one-half to Mobay Chemical Company, Pittsburgh, Pa., a corporation of Delaware
No Drawing. Filed May 23, 1957, Ser. No. 661,001
Claims priority, application Germany June 8, 1956
9 Claims. (Cl. 260—471)

This invention relates to a process for the production of mixtures of urethane polyisocyanates and urea diisocyanates. More particularly, the invention is concerned with a process for the production of solid low molecular mixtures of urethane polyisocyanates and urea diisocyanates.

It is well known to produce urea diisocyanates and urethane polyisocyanates, respectively, by reacting diisocyanates with water or polyhydric alcohols. While urea diisocyanates, such as N,N'-di-(4-methyl-3-isocyanatophenyl)-urea and its higher homologues, are crystalline to powdery substances with a relatively high melting point, urethane di- and polyisocyanates are in most cases of a resinous consistency. The urethane di- and polyisocyanates are obtained in the form of mixtures of polymers having terminal isocyanato groups. Even under special conditions of reaction, such as, for example, in those solvents or solvent combinations in which the primary addition products are only sparingly soluble, the latter cannot be removed quickly enough to prevent further reactions with the free glycols used as reactants so that in this case also resinous mixtures are the main product of the reaction. Such resinous mixtures are more difficult to handle than solid substances and cannot be stored over long periods since the reactive isocyanato groups and active hydrogen atoms of the urethane groups contained in these mixtures are not saturated by secondary valences to the same extent as in crystallized substances.

It is, therefore, a primary object of the present invention to provide a process resulting in the formation of solid low molecular urethane polyisocyanates. Another object of the present invention is to provide a process for the production of urethane polyisocyanates which can easily be handled. A further object of the invention is to provide a process for preparing urethane polyisocyanates that can be stored over long periods. A further object of the invention is to provide solid low molecular mixtures of urethane polyisocyanates and urea diisocyanates. Still further objects will appear hereinafter.

It has now been found in accordance with the present invention that solid crystalline or powdery, i.e., non-resinous, low molecular mixtures of urethane polyisocyanates and urea diisocyanates can be obtained by reacting a diisocyanate or a mixture of diisocyanates with a mixture containing water and a polyhydric alcohol or water and a mixture of polyhydric alcohols, using the components in such proportions that the sum of the number of mols of water and polyhydric alcohol is less than 1 mol, preferably 0.5 to 0.8 mol, per 1 mol of diisocyanate. The amount of water used in form of the water-polyhydric alcohol mixture shall be such that urea diisocyanates of the general formula I 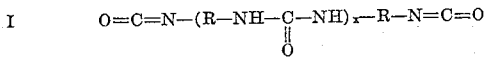

are formed in which $x$ represents an integer from 1 to 5 and R represents an aliphatic, cycloaliphatic, aromatic or araliphatic radical, which may be substituted.

The present invention is based on the discovery that urea diisocyanates have a hardening effect on urethane polyisocyanates and make it possible to produce dry, crystalline to powdery low molecular urethane polyisocyanates if the formation of these urethane polyisocyanates takes place simultaneously with the formation of the urea diisocyanates. Side reactions between the urea diisocyanates and the polyhydric alcohols on the one hand and between the urethane polyisocyanates and water on the other hand, and other possible reactions, for example, formation of macromolecular rings free from isocyanato groups, do not occur to any appreciable extent.

A very desirable feature of the process of the invention is that it results in the production of urethane polyisocyanate-urea diisocyanate mixtures which melt at a relatively low temperature. The mixtures obtainable by the process of the invention can be, therefore, easily processed and are particularly valuable as reactants in the production of polyurethane plastics.

Although any suitable diisocyanate may be used as starting material in the process of the invention, diisocyanates, the isocyanato groups of which have a different reactivity, are preferred. Examples of diisocyanates whose isocyanato groups are of unlike reactivity include, for example, 1-alkyl-benzene-2,4-diisocyanates, such as 1 - methyl benzene - 2,4 - diisocyanate, 1 - halogen benzene - 2,4 - diisocyanates, such as 1 - chlorobenzene 2,4-diisocyanate and 1-alkoxy benzene-2,4-diisocyanates, such as 1-methoxy benzene-2,4-diisocyanate. If a diisocyanate with uniformly reacting isocyanato groups is used in the process of the invention, it is advantageous to use it in admixture with a diisocyanate having isocyanato groups of different reactivities. Thus, the non-uniformly reacting diisocyanate may be mixed with say from about 10 to about 30% by weight of a diisocyanate having isocyanato groups of about the same reactivity. Any suitable diisocyanate may be used as isocyanate whose isocyanato groups exhibit about the same reactivity. There may be used relatively sluggish and very reactive diisocyanates, representative examples including, inter alia, 1-methyl benzene-2,6-diisocyanate, hexamethylene diisocyanate, chloro-p-phenylene diisocyanates, p-phenylene diisocyanates, m-phenylene diisocyanate, 4,4'-diphenyl methane diisocyanate, 4,4'-diphenyl dimethyl methane diisocyanate and naphthalene-1,5-diisocyanate.

Any suitable polyhydric alcohol may be used in the practice of the invention including, for example, aliphatic polyols of all kinds, such as ethylene glycol, 1,2-propylene glycol, hexane-diol, 2-ethyl hexane diol-1,3, glycerol, trimethylol propane and the reaction products of these or other polyols with ethylene oxide. Furthermore, there may be used sulfur containing glycols, such as thiodiglycol. Another group of polyhydric alcohols suitable for use in the process of the invention is made up of aliphatic-aromatic polyols, such as dimethylol xylenes, xylylidene glycols and the beta,beta'-dihydroxyl ethyl ether of 4,4'-dihydroxy diphenyl dimethyl methane. There may also be used urea glycols or urethane glycols, such as N,N'-dihydroxy ethyl urea or the reaction product of 1 mol of 1 methyl benzene-2,4-diisocyanate and 2 mols of glycol.

The urethane polyisocyanate-urea diisocyanate mixtures of the invention can be prepared in a particularly simple manner and in a relatively high degree of uniformity from hydrates of polyhydric alcohols, such as, for example, pinacol hydrate. When using such hydrates of polyhydric alcohols, it is not necessary to use water as a separate reactant in the process of the invention.

If the polyhydric alcohol used in the process of the invention is a dihydric alcohol, then in addition to the urea diisocyanates defined hereinabove, there will be obtained urethane polyisocyanates of the general formula II 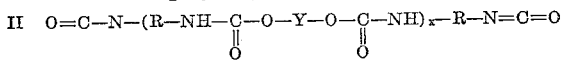

in which R and $x$ have the same meaning as in Formula I and in which Y represents a linear or branched aliphatic radical which may contain hetro atoms, ester groups, urea groups and/or urethane groups, or an aliphatic-aromatic, hydroaromatic or heterocyclic radical, Y being linked to the oxygen atoms by way of aliphatic radicals. If trihydric alcohols or alcohols containing more than three hydroxyl groups are used as the polyhydric alcohol reactant in the process of the invention, then the urethane polyisocyanates obtained may be represented by the same formula but Y is additionally connected to a corresponding number of urethane radicals containing isocyanato groups.

In carrying out the process of the invention, the reactants are preferably brought together in any suitable inert solvent therefor, such as, for example, acetone, methyl ethyl ketone or other ketones, acetonitrile, tetrahydrofurane or dioxane. It is preferred to use water-miscible solvents. It has been found advantageous to perform the process of the invention at temperatures ranging from about 10° to about 35° C. although higher or lower temperatures may be used, if desired. In a specific embodiment of the process of the invention, a mixture containing water, polyhydric alcohol and inert solvent is placed in a suitable reaction vessel and the diisocyanate reactant is added to the mixture all at one time while stirring. In another embodiment of the process of the invention, a mixture containing the diisocyanate component and the solvent is placed in the reaction vessel and the water-polyhydric alcohol mixture is added all at one time or drop-wise while stirring. Depending on the amount of water and polyhydric alcohol used, there are obtained mixtures of polymers which may be separated by fractional precipitation or solution. When using 0.25 mol of water and 0.25 mol of glycol per 1 mol of diisocyanate, the product mainly consists of a urea diisocyanate represented by Formula I, $x$ being equal to 1 and 2. In general, it has been found advantageous to use the reactants in such proportions as to form urethane polyisocyanate-urea diisocyanate mixtures containing 40 to 50% of the urea diisocyanate represented by Formula I. By varying the amounts of glycol and water, it is possible to produce the higher homologues in the formula of which $x$ is 3 to 5. The proportion of water and alcohol in the mixture to be added to the diisocyanate may, therefore, vary within wide limits. It is possible to have a molar ratio between water and alcohol of 0.5:1, it is preferred, however, to have molar ratios ranging from 1:1 to about 5:1. Molar ratios up to 10.1 are likewise within the scope of the invention. When higher than divalent alcohols are employed the number of OH-groups present in the alcohol molecule has to be taken in account when calculating the molar ratio.

The reaction products are obtained as solid powdery or crystalline materials which may be recovered from the solvent by any suitable process, such as by filtration, centrifugation or simply by drying in air.

The process of the invention can also be carried out continuously, for example, by introducing calculated amounts of the diisocyanate reactant and the water-polyhydric alcohol reactant into a solvent which is continuously circulated through a filter.

The urethane polyisocyanate-urea diisocyanate mixtures obtainable by the process of the invention are physiologically by far more inert than the diiosocyanates used in their preparation. They have a favorable range of softening temperatures, say from about 110° to about 165° C., and can, therefore, be easily processed. As distinguished from resinous urethane polyisocyanates, they have excellent storage ability, which means that their isocyanate content does not change even over long periods of time. For the above reasons, the urea diisocyanate-urethane polyisocyanate mixtures obtainable by the process of the invention are valuable intermediates for the production of valuable polyurethane plastics by polyaddition reactions. The resulting polyurethane plastics may be used for making various articles of commerce including gaskets, tires and household articles.

The following examples illustrate the process of the invention in greater detail, parts mentioned being parts by weight unless otherwise stated.

*Example 1*

About 522 parts of 1-methyl benzene-2,4-diisocyanate are added at one time to a mixture of about 18 parts of water, about 31 parts of ethylene glycol and about 522 parts by volume of acetone. The reaction is kept at room temperature by gentle cooling. Violent evolution of carbon dioxide and progressive crystallization starts after a few minutes. By stirring well, the reaction mixture solidifies after about 1–2 hours to form a crystal magma, which gives off the entrained solvent by trituration in an open vessel or preferably by thorough mixing in a kneading device without additional supply of heat and is obtained in the form of a colorless powder with a yield higher than 95%. The urea diisocyanate-urethane diisocyanate mixture which is obtained is of low molecular weight and is readily soluble in dimethyl formamide, starts to soften at 157° C. and has an isocyanate content of 22.7%.

*Example 2*

Using the procedure of Example 1, there are employed about 696 parts of an isomer mixture of 95% of 1-methyl benzene-2,4-diisocyanate and 5% of 1-methyl benzene-2,6-diisocyanate and a mixture of about 18 parts of water, about 62 parts of ethylene glycol and about 696 parts by volume of acetone. A dry urethane diisocyanate-urea diisocyanate mixture is obtained with a yield higher than 95%. The mixture is readily soluble in dimethyl formamide, starts to soften at 140° C. and has an isocyanate content of 21.4%.

*Example 3*

Using the procedure of Example 1, there are employed about 383 parts of 1-methyl benzene-2,4-diisocyanate and a mixture of about 18 parts of water, about 10.6 parts of diethylene glycol and about 340 parts by volume of acetone. A urea diisocyanate-urethane diisocyanate mixture is obtained with a yield comparable to that of Example 1. The mixture is readily soluble in dimethyl formamide, starts to soften at 155° C. and has an isocyanate content of 23.5%.

*Example 4*

The procedure is as in Example 1, using about 522 parts of 1-methyl benzene-2,4-diisocyanate and a mixture of about 18 parts of water, about 53 parts of dimethylene glycol and about 530 parts by volume of acetone. An equally good yield is obtained of a completely dry pulverulent urea diisocyanate-urethane diisocyanate mixture of an isocyanate content of 19.3% which starts to soften at 145° C.

*Example 5*

Using the procedure of Example 1, there are employed about 696 parts of 1-methyl benzene-2,4-diisocyanate and a solution of about 18 parts of water and about 90 parts of 1,4-butylene glycol in about 696 parts by volume of acetone. An equally good yield is obtained of a completely dry urethane diisocyanate-urea diisocyanate mixture, which mixture dissolves readily in dimethyl formamide, has an isocyanate content of 18.5%; and softens within the range: 120–138° C.

*Example 6*

Using the procedure indicated in Example 1, there are employed about 661 parts of 1-methyl benzene-2,4-diisocyanate and a mixture of about 18 parts of water, about 106 parts of diethylene glycol and about 500 parts by volume of acetone. After 8 minutes, a saturated solution of about 32 parts of 1,4-phenylene diisocyanate in acetone is added. There is obtained an equally good yield of a urethane diisocyanate-urea diisocyanate mixture, the mixture having an isocyanate content of 20.5% and softening from 148° C.

*Example 7*

The procedure indicated in Example 6 is used, but a saturated acetone solution of about 32 parts of 1,3-phenylene diisocyanate is added. There is obtained an equally good yield of a dry urethane diisocyanate-urea diisocyanate mixture with an isocyanate content of 19.6%, the mixture softening from 144° C.

*Example 8*

Using the procedure indicated in Example 1, there are employed about 661 parts of an isomer mixture of 70% of 1-methyl benzene-2,4-diisocyanate and 30% of 1-methyl benzene-2,6-diisocyanate, about 35 parts of hexamethylene diisocyanate and a mixture of about 18 parts of water, about 106 parts of diethylene glycol and about 670 parts by volume of acetone. There is obtained a similarly good yield of a pulverulent soluble urea diisocyanate-urethane diisocyanate mixture, which starts to soften at 142° C. and has an isocyanate content of 17.6%.

*Example 9*

The procedure indicated in Example 1 is used and there are employed about 696 parts of 1-methyl benzene-2,4-diisocyanate and a mixture of about 18 parts of water, about 78 parts of 1,2-propylene glycol and about 696 parts by volume of acetone. There is obtained a substantially quantitative yield of a powdered urea diisocyanate-urethane diisocyanate mixture, which is readily soluble, softens from 132° C. and has an isocyanate content of 18.6%.

*Example 10*

The procedure indicated in Example 1 is used and there are employed about 696 parts of 1-methyl benzene-2,4-diisocyanate and a mixture of about 18 parts of water, about 266 parts of hydroxy-ethylated trimethylol propane and about 700 parts by volume of acetone. After a relatively long drying period, there is obtained a powdery urea polyisocyanate-urethane polyisocyanate mixture with an isocyanate content of 21%, and softening at 151° C.

*Example 11*

Using the procedure indicated in Example 1, there are employed about 696 parts of 1-methyl benzene-2,4-diisocyanate and a mixture of about 18 parts of water, and about 134 parts of a technical hexanetriol and after a relatively long drying period at room temperature, there is obtained a similarly good yield of a urea polyisocyanate-urethane polyisocyanate mixture containing 20.4% of isocyanate groups and softening at 143° C.

*Example 12*

Using the procedure indicated in Example 11, but using about 162 parts of 2-ethyl hexenediol-1,3, there is obtained an equally good yield of a urethane-urea diisocyanate mixture with an isocyanate content of 18.2%, and a softening point at 128° C.

*Example 13*

Using the procedure indicated in Example 11, there are employed about 696 parts of 1-methyl benzene-2,4-diisocyanate and a solution of about 1 mol of a polyhydric alcohol mixture, which is composed of about 0.1 mol of each of the following diols: ethylene glycol, 1,4-butylene glycol, diethylene glycol, triethylene glycol, 2-ethyl hexanediol-1,3, hexanetriol, tetrabutylene glycol, hydroxy-ethylated trimethylol propane, dimethyl-4,4'-dihydroxy - diphenyl methane - beta,beta' - dihydroxyethyl ether and 1,2-propylene glycol. After a relatively long drying period at room temperature, there is obtained a urea polyisocyanate-urethane polyisocyanate mixture with an isocyanate content of 14.7%, this mixture being very soluble in dimethyl formamide. The mixture starts to soften at 118° C.

*Example 14*

Using the procedure indicated in Example 1, there are employed about 69.4 parts of 1-methyl benzene-2,4-diisocyanate and a mixture of 1.8 parts of water and 11.8 parts of pinacol. After being dried for a relatively long time at room temperature, there is obtained a urethane diisocyanate-urea diisocyanate mixture, this mixture having an isocyanate content of 18.9% and softening at 156° C.

*Example 15*

Using the procedure indicated in Example 14, there are employed about 69.4 parts of 1-methyl benzene-2,5-diisocyanate and a solution of 13.6 parts of pinacol hydrate. The reaction takes place more slowly, but there is obtained a similarly good yield of a pulverulent urea diisocyanate-urethane diisocyanate mixture, which is separated into two fractions: first fraction 25.2% isocyanate M.P.=184–185° C., second fraction 23.5% isocyanate M.P.=179–185° C.

*Example 16*

Using the procedure indicated in Example 1, there are employed 669 parts of 1-methyl benzene-2,4-diisocyanate and a mixture of 18 parts of water, 90 parts of 1,4-butylene glycol and 696 parts by volume of acetonitrile. After thoroughly stirring for some hours the reaction mixture solidifies to a crystal mass. The solvent is removed in vacuo at a temperature of about 20–30° C. The product is washed with petroleum ether whereafter a urea polyisocyanate-urethane polyisocyanate mixture containing 70.9% of isocyanate groups is obtained. Softening interval 120–138° C. The product is soluble in dimethyl formamide.

*Example 17*

The procedure indicated in Example 1 is used, and there are employed 522 parts of a mixture consisting of 70% of 1-methyl benzene-2,4-diisocyanate and 30% 1-methyl benzene-2,6-diisocyanate together with 18 parts of water, 53 parts of diethylene glycol and 530 parts by volume of tetrahydrofurane. After some hours the solvent is removed in vacuo. There is obtained a good yield of a dry pulverulent urea polyisocyanate-urethane polyisocyanate mixture containing 18.9% of isocyanate groups and softening above 150° C.

While certain representative embodiments and details have been shown for the purpose of illustrating this invention, it will be apparent to those skilled in the art that various changes and modifications may be made therein without departing from the spirit and scope of the invention except as set forth in the claims.

What is claimed is:

1. A solid particulate non-resinous mixture of urea diisocyanates and urethane diisocyanates prepared by reacting in an inert solvent an arylene diisocyanate having —NCO groups of unequal reactivity, substantially simultaneously with water and a polyhydric alcohol having from two to three hydroxyl groups, the ratio of water to polyhydric alcohol being within the range of from about 0.5 mol to about 10 mols water per mol of polyhydric alcohol, the total mols of water and polyhydric alcohol hydroxyl groups being less than equivalent to the mols of organic diisocyanate.

2. A solid particulate non-resinous mixture of urea diisocyanates and urethane diisocyanates prepared by reacting in an inert solvent, an organic diisocyanate selected from the group consisting of arylene diisocyanates having —NCO groups of unequal reactivity and a mixture thereof with from about 10 to about 30 percent by weight of an arylene diisocyanate having —NCO groups of substantially equal reactivity, substantially simultaneously with water and a polyhydric alcohol having from two to three hydroxyl groups, the ratio of water to polyhydric alcohol being within the range of from about 0.5 mol to about 10 mols water per mol of polyhydric alcohol, the total mols of water and polyhydric alcohol hydroxyl groups being less than equivalent to the mols of organic diisocyanate.

3. A solid particulate non-resinous mixture of urea diisocyanates and urethane diisocyanates prepared by reacting in an inert solvent, an organic diisocyanate selected from the group consisting of arylene diisocyanates having —NCO groups of unequal reactivity and a mixture thereof with from about 10 to about 30 percent by weight of hexamethylene diisocyanate substantially simultaneously with water and a polyhydric alcohol having from two to three hydroxyl groups, the ratio of water to polyhydric alcohol being within the range of from about 0.5 mol to about 10 mols water per mol of polyhydric alcohol, the total mols of water and polyhydric alcohol hydroxyl groups being less than equivalent to the mols of organic diisocyanate.

4. The product of claim 2 wherein the sum of the mols of water and mols polyhydric alcohol is within the range of about 0.5 to about 0.8 mol per mol of the organic diisocyanate.

5. The product of claim 2 wherein the aromatic diisocyanate is 1-methyl benzene-2,4-diisocyanate.

6. A method for making a solid particulate non-resinous mixture of urea diisocyanates and urethane diisocyanates prepared by reacting in an inert solvent, an organic diisocyanate selected from the group consisting of arylene diisocyanates having —NCO groups of unequal reactivity and a mixture thereof with from about 10 to about 30 percent by weight of an arylene diisocyanate having —NCO groups of substantially equal reactivity, substantially simultaneously with water and a polyhydric alcohol having from two to three hydroxyl groups, the ratio of water to polyhydric alcohol being within the range of from about 0.5 mol to about 10 mols water per mol of polyhydric alcohol, the total mols of water and polyhydric alcohol hydroxyl groups being less than equivalent to the mols of organic diisocyanate.

7. The process of claim 6 wherein the sum of the mols of water and mols of polyhydric alcohol is about 0.5 to about 0.8 mol per mol of organic diisocyanate.

8. The process of claim 6 wherein the aromatic diisocyanate is 1-methyl benzene-2,4-diisocyanate.

9. The process of claim 6 wherein the reaction is effected at a temperature of from about 10° C. to about 35° C.

References Cited in the file of this patent
UNITED STATES PATENTS

| | | |
|---|---|---|
| 2,597,025 | Orth | May 20, 1952 |
| 2,702,797 | Rugg | Feb. 22, 1955 |
| 2,734,045 | Nelson | Feb. 7, 1956 |
| 2,785,150 | Kreider et al. | Mar. 12, 1957 |
| 2,818,404 | Hill | Dec. 31, 1957 |

OTHER REFERENCES

De Bell, German Plastics Practice (1946), page 304.